US012080974B2

(12) United States Patent
Zhao

(10) Patent No.: US 12,080,974 B2
(45) Date of Patent: Sep. 3, 2024

(54) ELECTRICAL CONNECTOR HAVING AN INSULATIVE OUTER COVER AND A SEALING MEMBER EXTENDING THROUGH A FRONT PORTION OF THE OUTER COVER

(71) Applicants: FUYU ELECTRONICAL TECHNOLOGY (HUAIAN) CO., LTD., Huai'an (CN); FOXCONN INTERCONNECT TECHNOLOGY LIMITED, Grand Cayman (KY)

(72) Inventor: Jun Zhao, Huaian (CN)

(73) Assignees: Fuyu Electronic Technology (Huai'an) Co., Ltd., Huai'an (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 74 days.

(21) Appl. No.: 17/582,161

(22) Filed: Jan. 24, 2022

(65) Prior Publication Data

US 2022/0247118 A1 Aug. 4, 2022

(30) Foreign Application Priority Data

Jan. 30, 2021 (CN) ......................... 202120263730.6

(51) Int. Cl.

| | |
|---|---|
| ***H01R 13/52*** | (2006.01) |
| ***H01R 13/6581*** | (2011.01) |
| ***H01R 13/6594*** | (2011.01) |
| *H01R 13/6591* | (2011.01) |

(52) U.S. Cl.

CPC ..... *H01R 13/5219* (2013.01); *H01R 13/6581* (2013.01); *H01R 13/6594* (2013.01); *H01R 13/52* (2013.01); *H01R 13/5202* (2013.01); *H01R 13/521* (2013.01); *H01R 13/5213* (2013.01); *H01R 13/6591* (2013.01)

(58) Field of Classification Search

CPC ............ H01R 13/5219; H01R 13/6581; H01R 13/6594; H01R 13/52; H01R 13/5202; H01R 13/521; H01R 13/5213; H01R 13/6591

See application file for complete search history.

(56) References Cited

U.S. PATENT DOCUMENTS

| | | | | |
|---|---|---|---|---|
| 10,276,971 B2 | 4/2019 | Zhao | | |
| 2018/0175543 A1* | 6/2018 | Zhao | .................. | H01R 13/5219 |
| 2018/0191092 A1* | 7/2018 | Zhou | .................. | H01R 13/6471 |

FOREIGN PATENT DOCUMENTS

| | | |
|---|---|---|
| TW | M479537 U | 6/2014 |
| TW | 201834328 A | 9/2018 |

* cited by examiner

*Primary Examiner* — Justin M Kratt
(74) *Attorney, Agent, or Firm* — Ming Chieh Chang

(57) ABSTRACT

An electrical connector includes: a contact module including an insulative housing and plural contacts; an insulative outer cover enclosing the contact module; and a sealing member mounted to a front portion of the insulative outer cover, wherein the sealing member has an integral part extending through the front portion of the insulative outer cover.

5 Claims, 7 Drawing Sheets

ELECTRICAL CONNECTOR HAVING AN INSULATIVE OUTER COVER AND A SEALING MEMBER EXTENDING THROUGH A FRONT PORTION OF THE OUTER COVER

BACKGROUND OF THE INVENTION

1. Field of the Invention

The present invention relates to an electrical connector comprising a contact module including an insulative housing and a plurality of contacts, an insulative outer cover enclosing the contact module, and a sealing member securely mounted to a front portion of the insulative outer cover.

2. Description of Related Art

U.S. Pat. No. 10,276,971 discloses an electrical connector comprising a contact module, an insulative outer cover enclosing the contact module, and a sealing member mounted to a front portion of the insulative outer cover. Taiwan Patent No. 479537 discloses an electrical connector comprising a contact module, a metallic shielding shell enclosing the contact module, and a sealing member mounted to the shielding shell and having an integral part extending through a rear portion of the shielding shell.

SUMMARY OF THE INVENTION

An electrical connector comprises: a contact module including an insulative housing and a plurality of contacts; an insulative outer cover enclosing the contact module; and a sealing member mounted to a front portion of the insulative outer cover, wherein the sealing member has an integral part extending through the front portion of the insulative outer cover.

DETAILED DESCRIPTION OF THE PREFERRED EMBODIMENT

Figure 1:
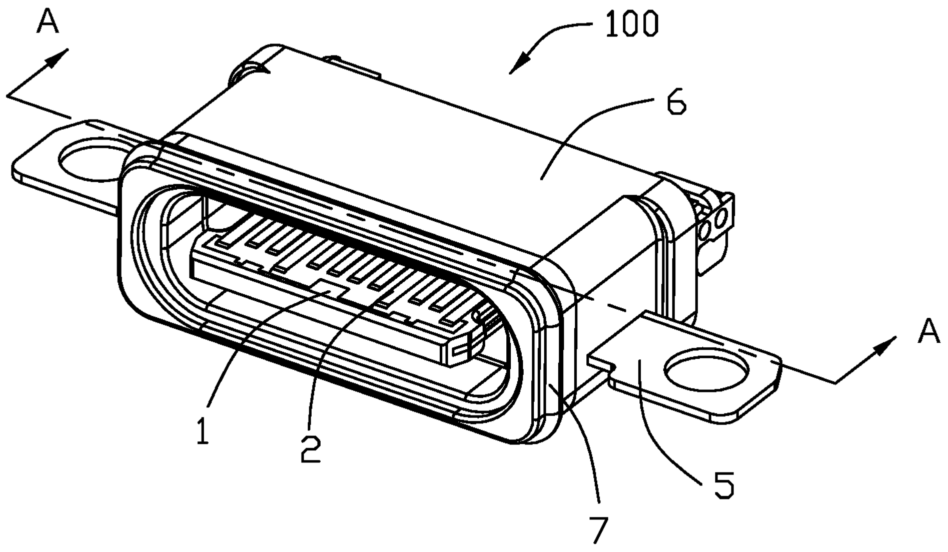
FIG. 1 is a perspective view of an electrical connector of the present invention.
Figure 2:
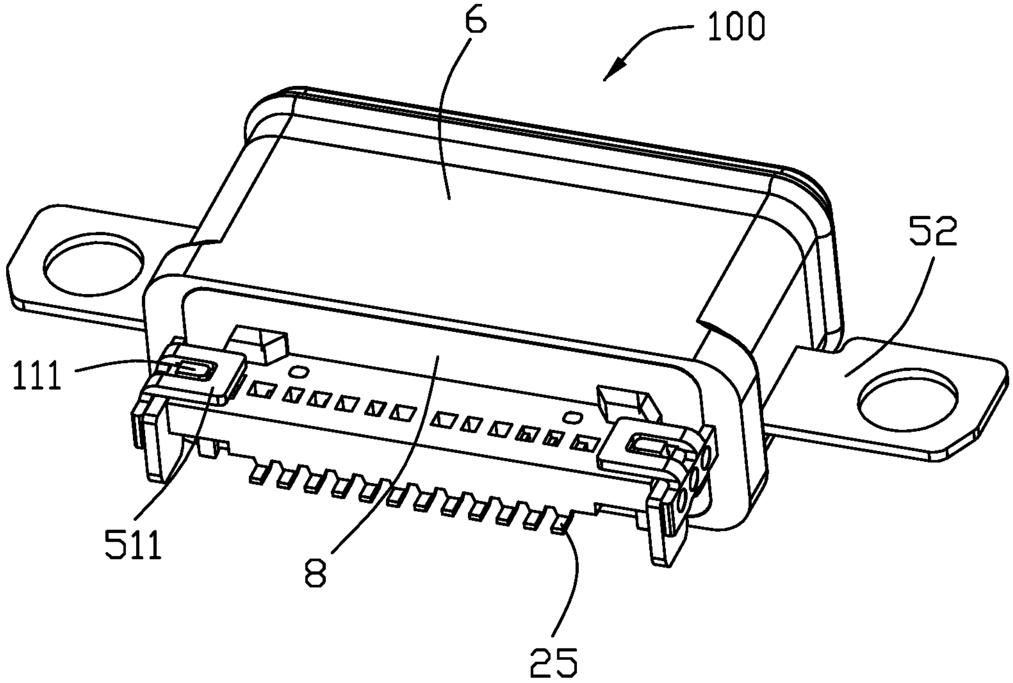
FIG. 2 is another perspective view of the electrical connector.
Figure 3:
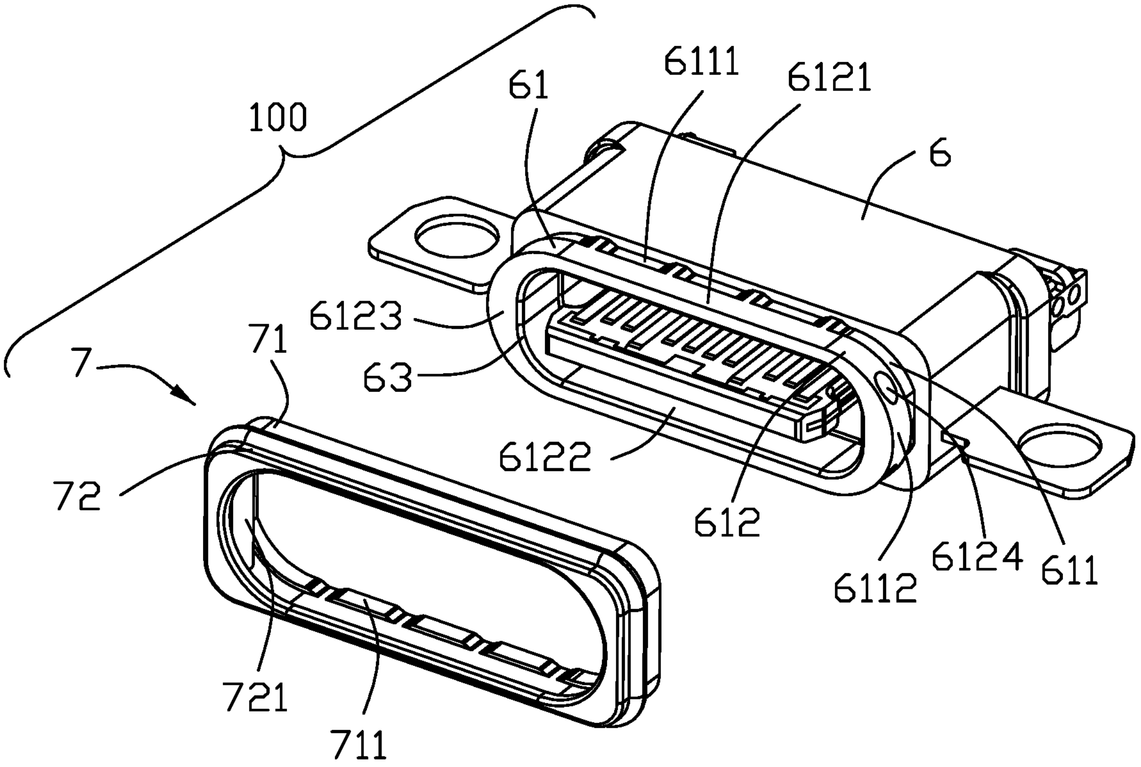
FIG. 3 is an exploded view of the electrical connector.
Figure 4:
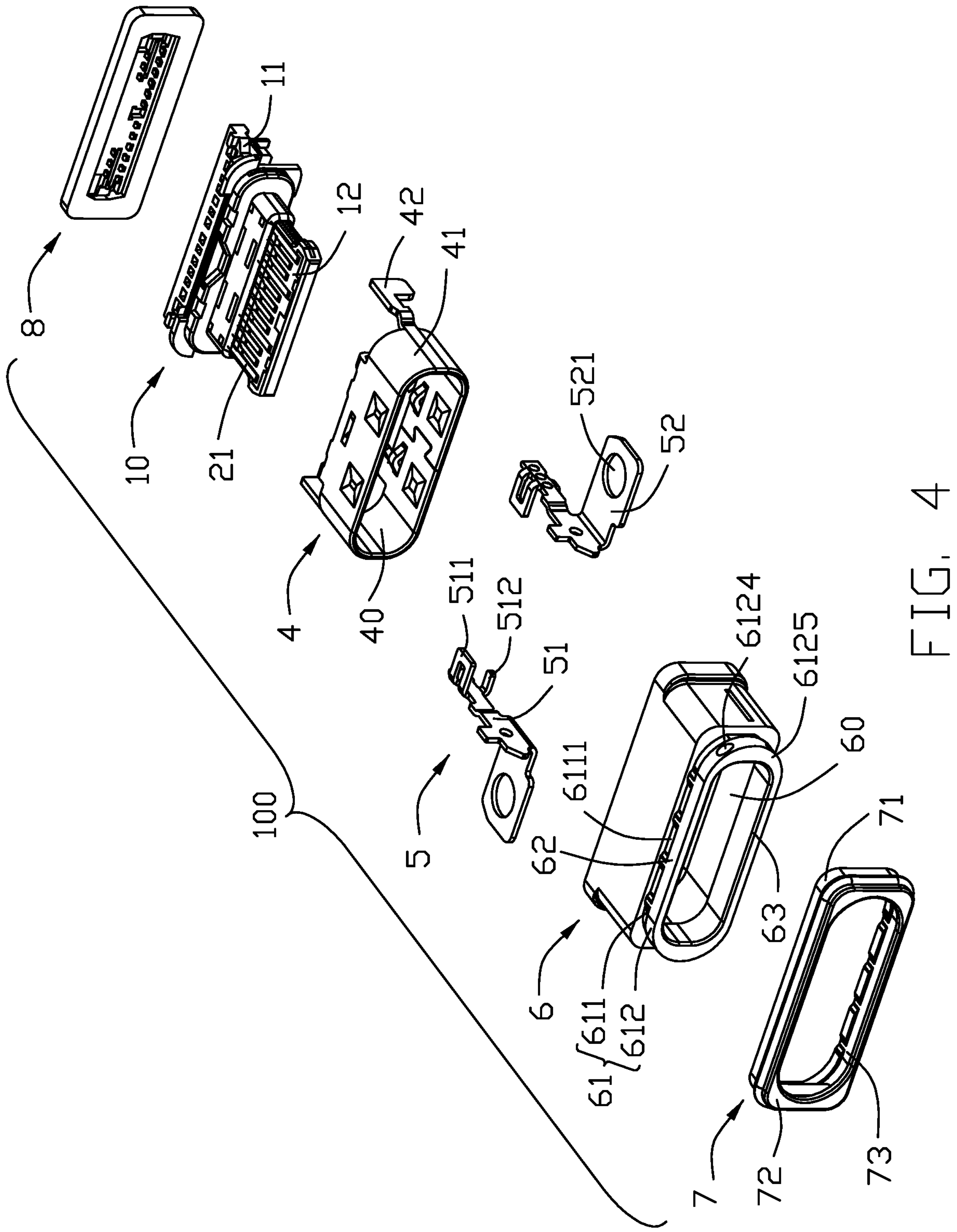
FIG. 4 is a further exploded view of FIG. 3.
Figure 5:
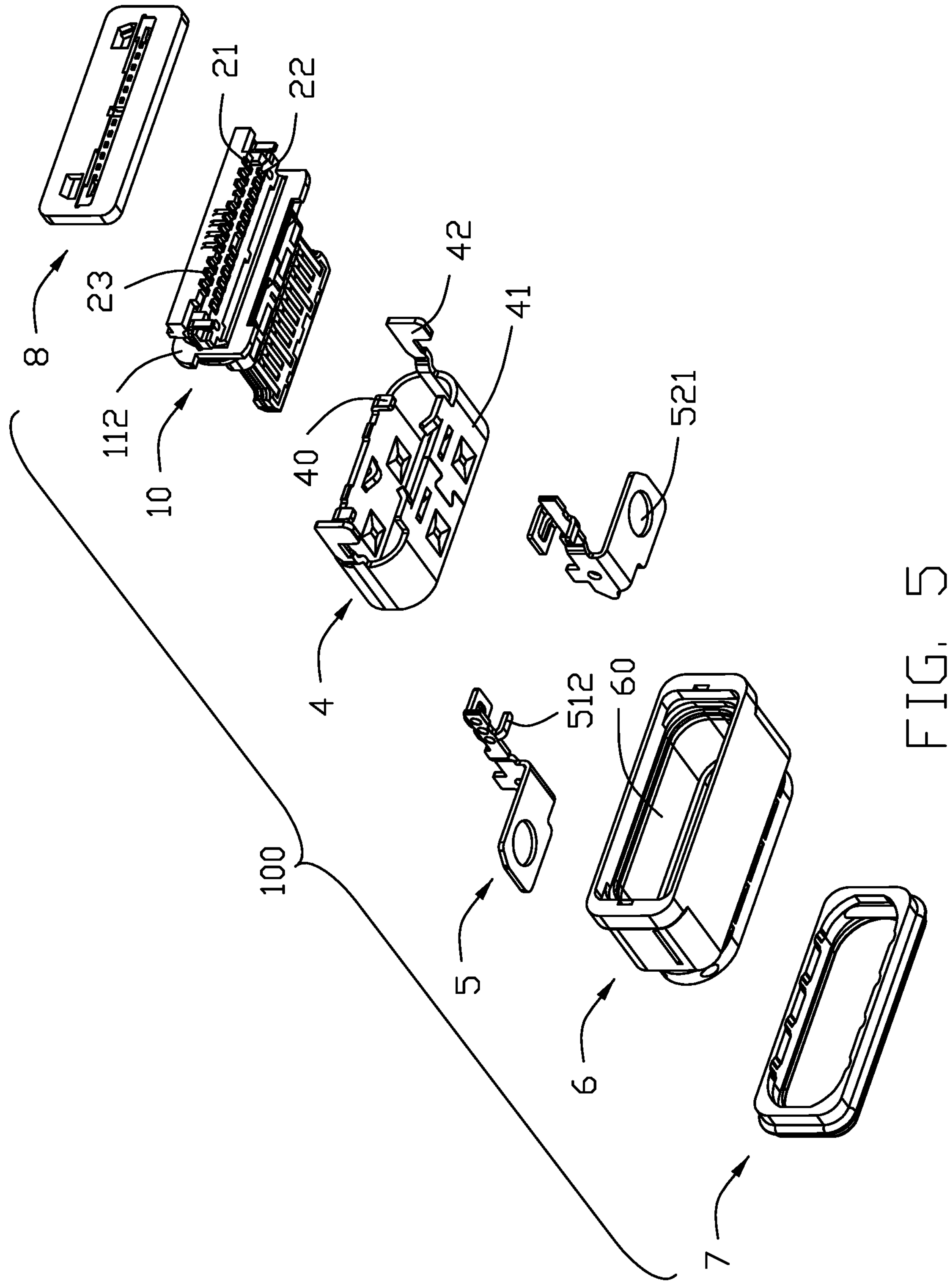
FIG. 5 is a view similar to FIG. 4 but from a different perspective.
Figure 6:
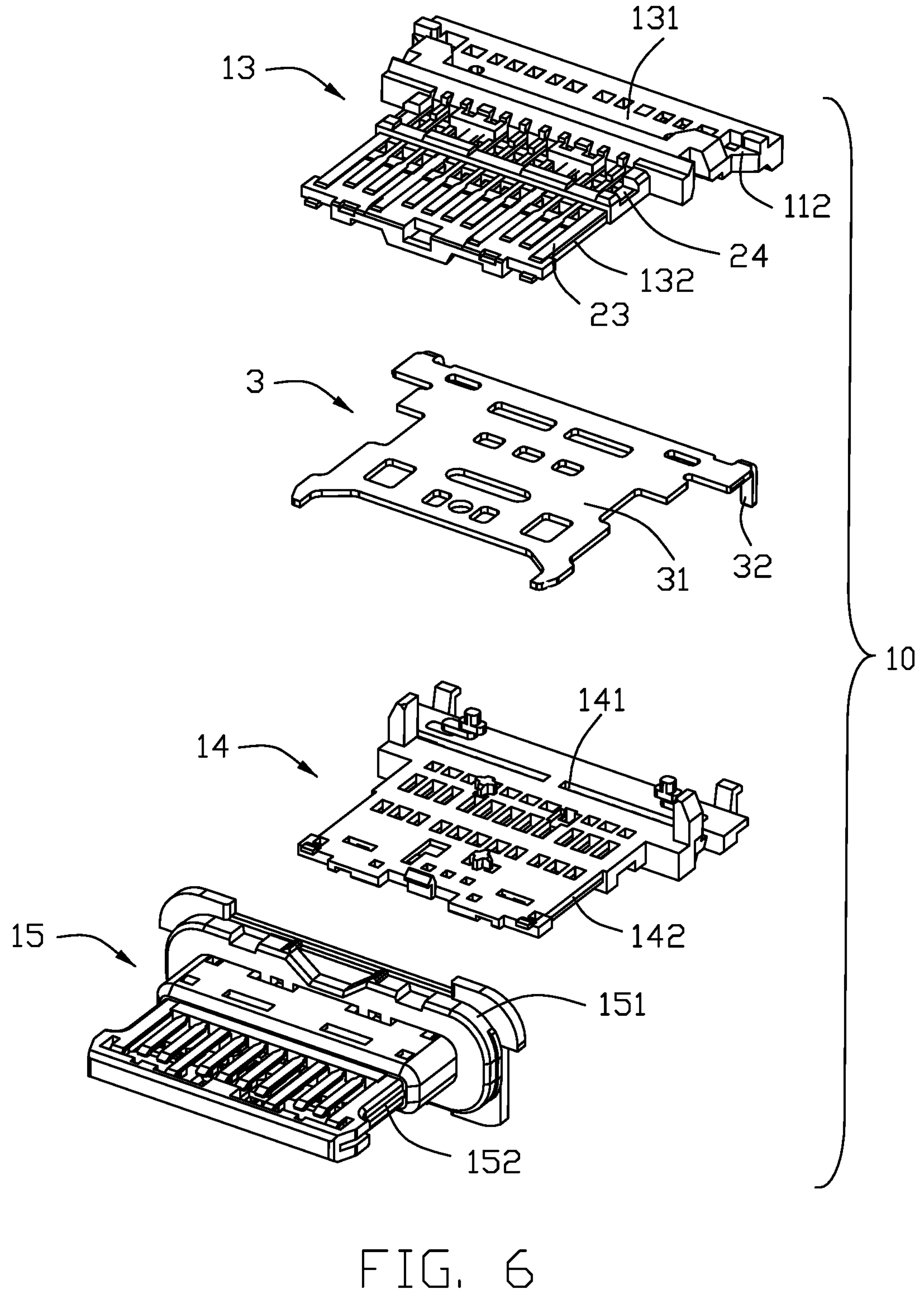
FIG. 6 is an exploded view of a contact module of the electrical connector.

Referring to FIGS. 1-7, an electrical connector 100 to be mounted on a printed circuit board comprises a contact module 10, an insulative outer cover 6 having a receiving space 60 for accommodating the contact module 10, and a sealing member 7 secured to the outer cover 6. The electrical connector 100 may further include a metallic shielding shell 4 enclosing the contact module 10, a pair of fixing pieces 5 secured to the outer cover 6, and a rear sealing member 8 for water-proof. The contact module 10 includes an insulative housing 1 and an upper and lower rows of contacts 2. The contact module 10 may further include a middle shielding plate 3.

The insulative housing 1 has a base 11 and a tongue 12. The housing 1 is constructed of an upper body 13, a lower body 14, and an over-mold 15. The upper body 13 has a base part 131 and a tongue part 132; the lower body 14 has a base part 141 and a tongue part 142; the over-mold 15 has a base part 151 and a tongue part 152. The base parts 131, 141, and 151 constitute the base 11 and the tongue parts 132, 142, and 152 constitute the tongue 12.

The upper row of contacts 21 are secured to the upper body 13 and the lower row of contacts 22 are secured to the lower body 14. The upper row of contacts 21 and the lower row of contacts 22 are equal in number. Each of the upper and lower contacts 21 and 22 has a contacting portion 23, a soldering tail 25, and a connecting portion 24 therebetween. The upper and lower rows of contacts 21 and 22 are exposed respectively to an upper and lower surfaces of the tongue 12.

The shielding plate 3 is unitary and disposed between the upper row of contacts 21 and the lower row of contacts 22. The shielding plate 3 has a main body 31 and a pair of soldering legs 32. The main body 31 has two side portions exposed out of the base 11.

The shielding shell 4 includes a receiving space 40 for receiving a part of the contact module 10, a main part 41, and a pair of side arms 42 at rear sides of the main part 41 for engaging the exposed side portions of the shielding plate 3. A rear end of the main part 41 abuts against a front end of the base 11.

Figure 7:
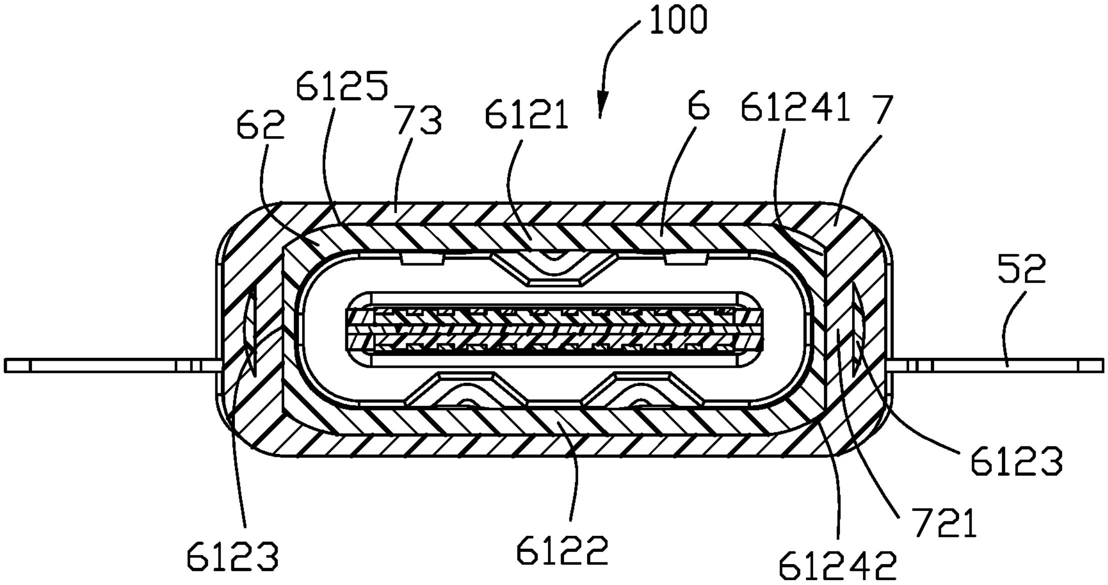
FIG. 7 is a cross-sectional view of the electrical connector taken along line A-A in FIG. 1.

The outer cover 6 encloses the shielding shell 4 and the contact module 10. The outer cover 6 includes a receiving space 60, a front portion 61 with a peripheral wall 62, and a front port 63. The front portion 61 has an upper wall 6121, a lower wall 6122, and a pair of side walls 6123. At least one of the upper wall 6121, the lower wall 6122, and the pair of side walls 6123 has a through hole 6124 not in communication with the receiving space 60. The sealing member 7 has an integral part extending through the front portion 61 of the insulative outer cover. Specifically, the integral part of the sealing member 7 includes a pair of reinforcing ribs 721 molded in the through holes 6124 disposed on the pair of side walls 6123. As viewed in FIG. 7, a dimension of the side wall 6123 is generally greater than a dimension of the upper wall 6121 or the lower wall 6122 so as to provide the through hole 6124 without adversely affecting structural strength of the side wall. The sealing member 7 is mounted at the peripheral wall 62 of the insulative outer cover 6. The front portion 61 of the insulative outer cover 6 includes a front stop 612 and a rear recess 611. The recess 611 has plural grooves 6111 and a pair of straight side faces 6112. The front stop 612 forms the wall 6125 of the port 63 and the through hole 6124 is formed at the wall 6125. The through hole 6124 is generally cylindrical. The through hole 6124 is not in fluid communication with a front face of the front portion 61. As seen in FIG. 7, the through hole 6124 has a first side 61241 and a second side 61242.

Each fixing piece 5 is insert-molded to the insulative outer cover 6 and has a securing part 51 and a positioning part 52. The securing part 51 has a clip 511 for clipping to a protrusion 111 of the base 11 and a finger 512 for engaging a slot 112 of the base 11 so that the insulative outer cover 6 is firmly secured to the insulative housing 1. The positioning part 52 has a hole 521.

The sealing member 7 is formed by solidifying or curing suitable material in liquefied state onto the peripheral wall 62 of the insulative outer cover 6 and has an inner surface

73. The sealing member 7 is constructed of a first part 71 affixed to the rear recess 611 and a second part 72 affixed to the front stop 612. The first part 71 has plural protrusions 711 engaging the grooves 6111. The second part 72 includes the pair of reinforcing ribs 721.

What is claimed is:

1. An electrical connector comprising:

a contact module including an insulative housing and a plurality of contacts;

an insulative outer cover enclosing the contact module; and a sealing member mounted to a front portion of the insulative outer cover; wherein the sealing member has an integral part extending through the front portion of the insulative outer cover, the integral part of the sealing member including a pair of reinforcing ribs located inwardly of the inner surface of the sealing member; and the front portion of the insulative outer cover has a peripheral wall and the sealing member has an inner surface engaging an outer surface of the peripheral wall.

2. The electrical connector as claimed in claim 1, wherein the front portion of the insulative outer cover includes a pair of side walls each having a through hole, and the integral part of the sealing member includes a pair of reinforcing ribs molded in the through holes of the pair of side walls.

3. The electrical connector as claimed in claim 1, wherein the front portion of the insulative outer cover includes a front stop and a rear recess, and the integral part of the sealing member includes a pair of reinforcing ribs embedded in the front stop.

4. The electrical connector as claimed in claim 1, further comprising a shielding shell mounted in the insulative outer cover and enclosing the contact module.

5. The electrical connector as claimed in claim 1, wherein the insulative housing has a base and a tongue, and the plurality of contacts include upper and lower rows of contacts exposed respectively on upper and lower surfaces of the tongue.

* * * * *